March 14, 1933. E. J. BRANDT 1,901,081
MONEY HANDLING MACHINE
Original Filed May 24, 1924    8 Sheets-Sheet 2

Inventor
*Edward J. Brandt,*
By Milans & Milans
Attorneys

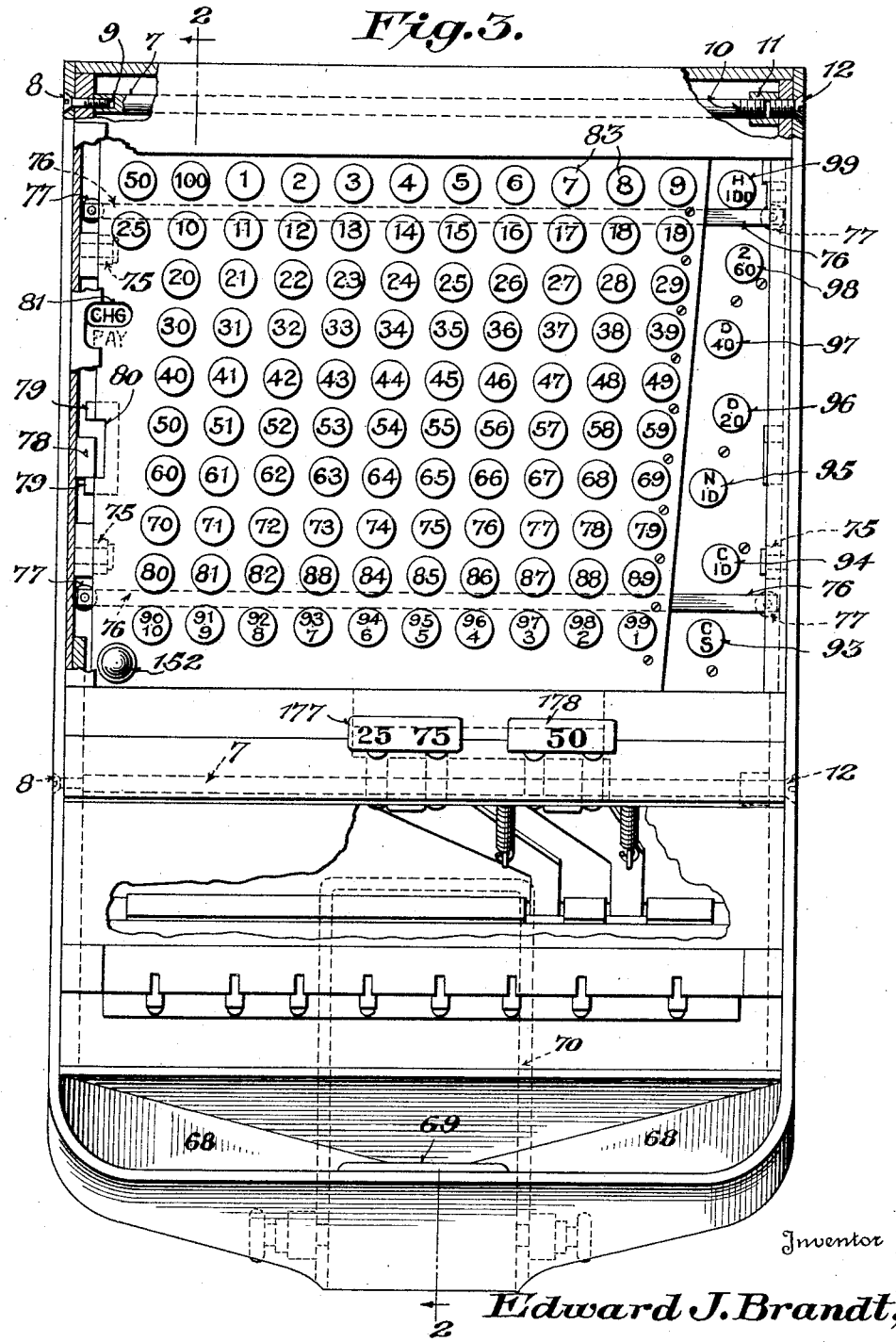

March 14, 1933.　　　E. J. BRANDT　　　1,901,081
MONEY HANDLING MACHINE
Original Filed May 24, 1924　　　8 Sheets-Sheet 4
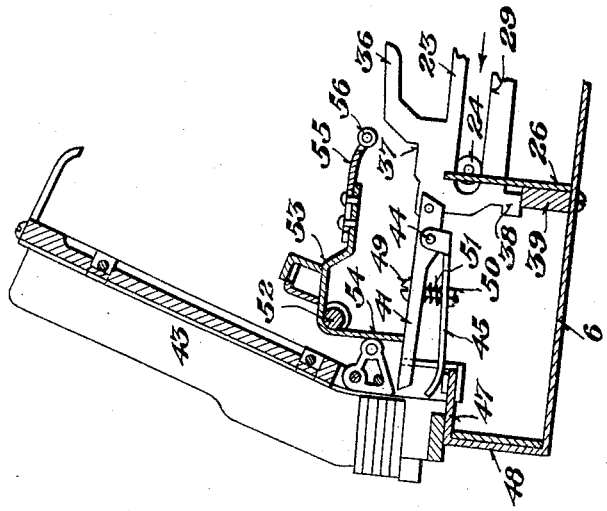
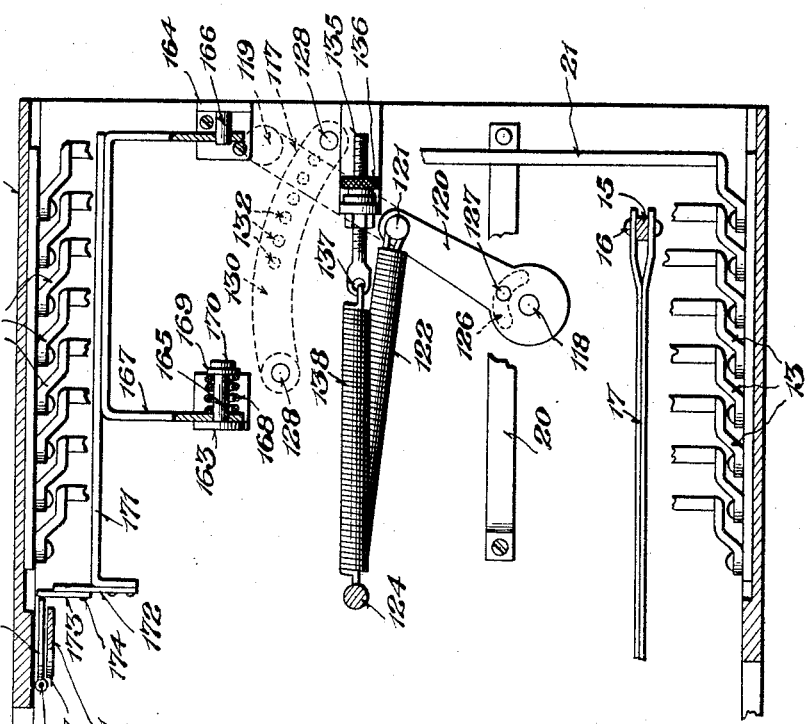
Inventor
*Edward J. Brandt,*
By Milans + Milans
Attorneys March 14, 1933.  E. J. BRANDT  1,901,081
MONEY HANDLING MACHINE
Original Filed May 24, 1924  8 Sheets-Sheet 5
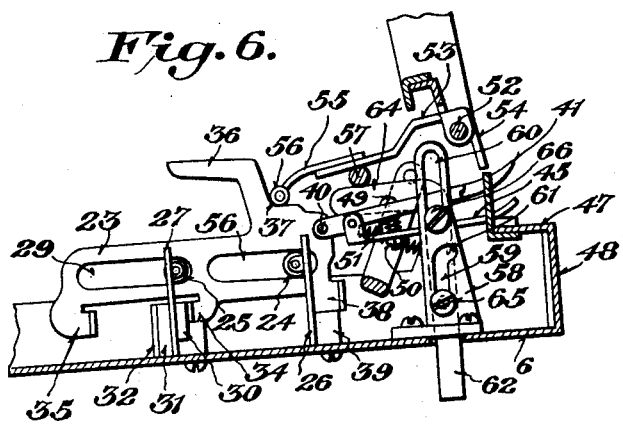
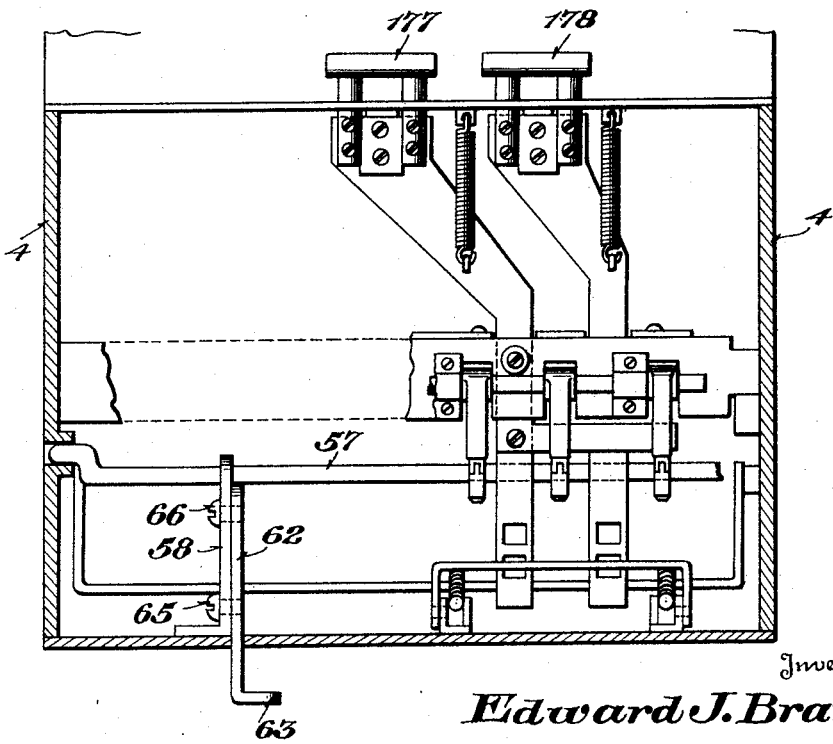
Inventor
Edward J. Brandt,
By Milans & Milans
Attorneys March 14, 1933.  E. J. BRANDT  1,901,081
MONEY HANDLING MACHINE
Original Filed May 24, 1924   8 Sheets-Sheet 6
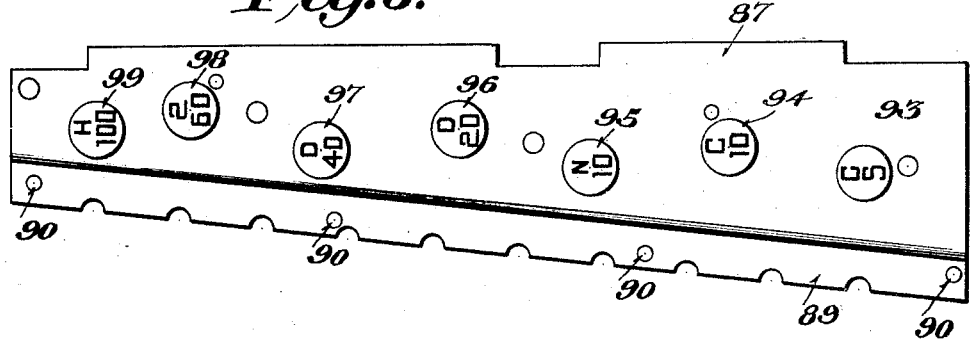
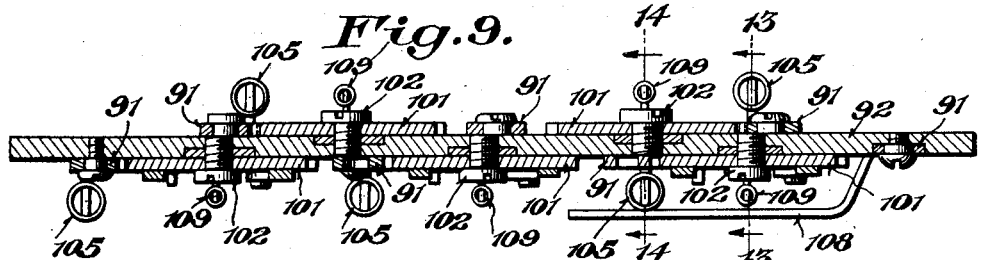
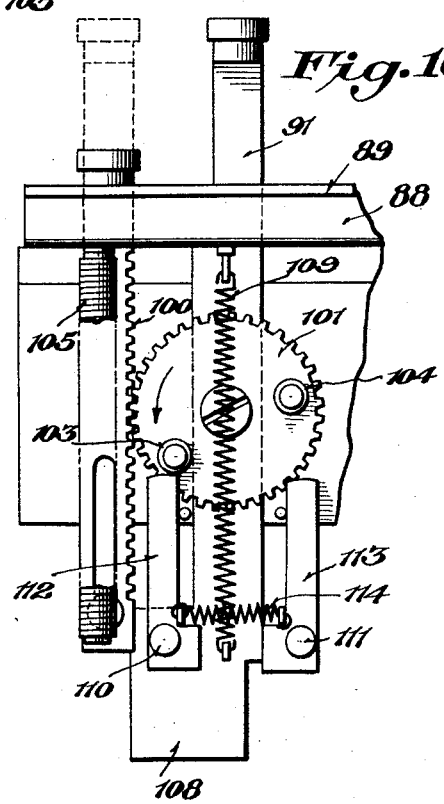
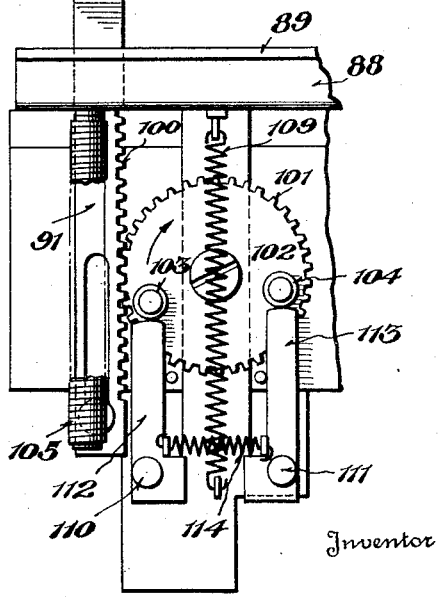
Inventor
Edward J. Brandt,
By Milans & Milans
Attorneys

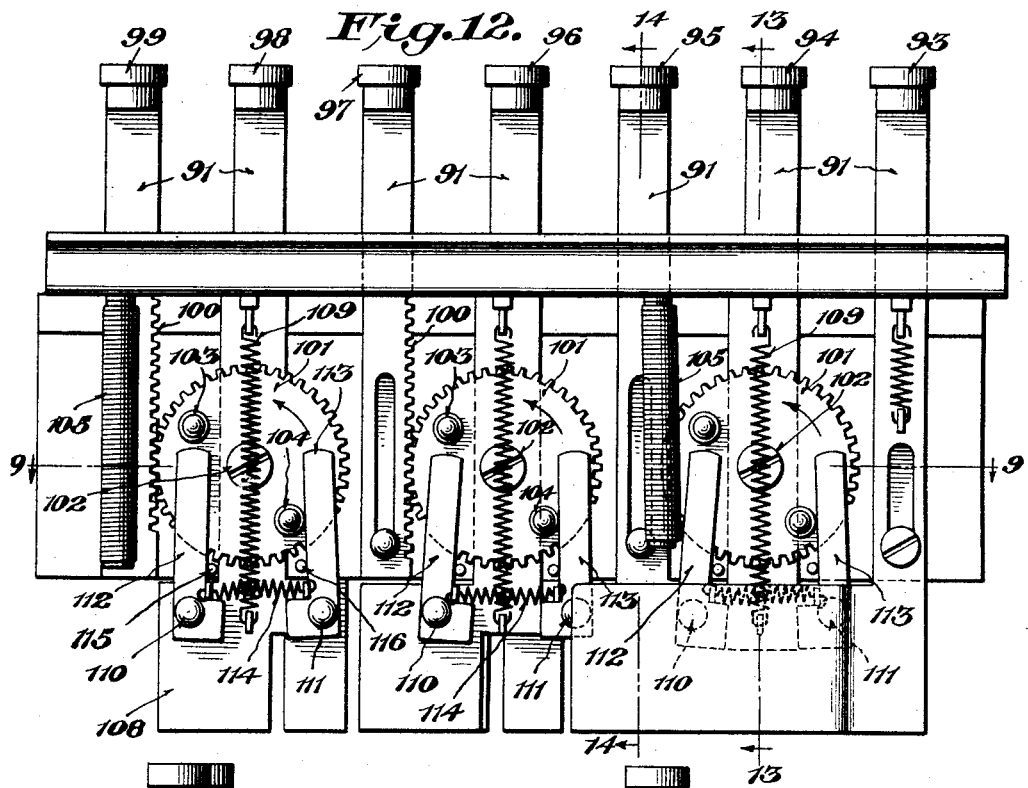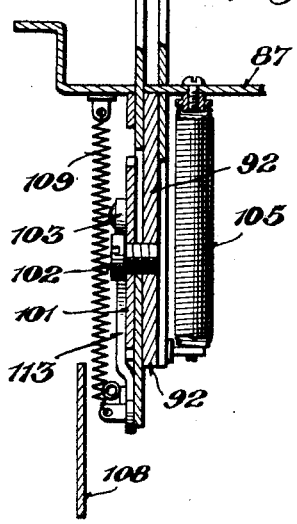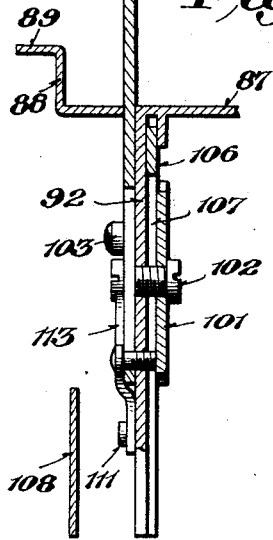

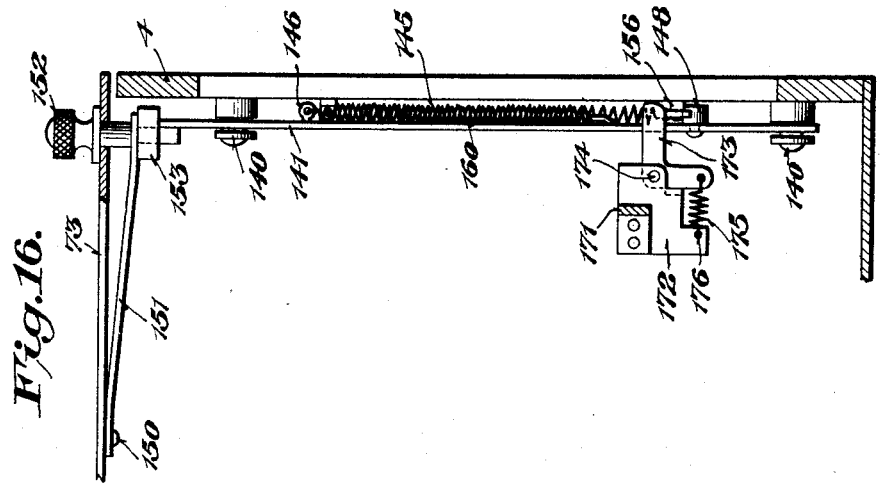
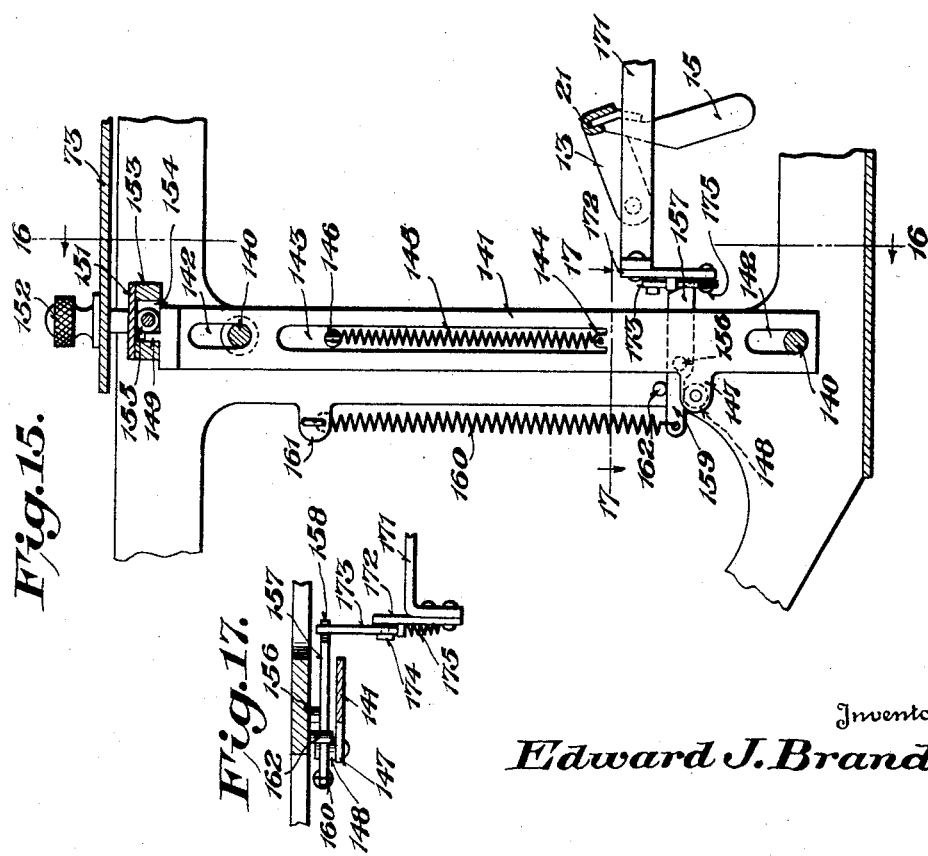

Patented Mar. 14, 1933

1,901,081

UNITED STATES PATENT OFFICE

EDWARD J. BRANDT, OF WATERTOWN, WISCONSIN, ASSIGNOR TO BRANDT AUTOMATIC CASHIER COMPANY, OF WATERTOWN, WISCONSIN, A CORPORATION OF WISCONSIN

MONEY HANDLING MACHINE

Original application filed May 24, 1924, Serial No. 715,662. Divided and this application filed February 4, 1932. Serial No. 590,956.

My invention relates to new and useful improvements in money handling machines which have become familiarly known as the "Brandt" type of automatic cashier and the present application is a division of my application filed May 24, 1924, Serial No. 715,662.

The principal object of the present invention resides in the provision of a plurality of what may be termed double acting keys and ejecting mechanism so that coins will be ejected both when the keys are depressed and when returning to their normal position. In other words I have provided mechanism whereby when a key is depressed it will deliver the amount designated upon the key and will also deliver a like amount upon the upward movement of the key or the movement of the key in returning to its original or normal position. For an example I will say that a key bears a designating mark to deliver five pennies from the coin tray or magazine. When this key is depressed it will deliver five pennies from the coin tray and when it raises or returns to its normal position an additional five pennies will be delivered from the tray. It will thus be seen that I have provided a very quick movement whereby a plurality of coins of a similar denomination may be delivered from the coin tray.

A further object of the invention consists in the provision of a machine which may be readily changed from a "payer" basis to a "changer" basis or from a "changer" basis to a "payer" basis, a movable keyboard being provided for this purpose, said keyboard including a plurality of keys bearing designating marks, certain of the keys being what may be termed double acting keys operating suitable mechanism for delivering a predetermined number of coins when being depressed as well as when returning to their normal or raised position, these double acting keys being operable when the machine is either on a "payer" or "changer" basis.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me it will be understood that such changes may be made as will fall within the scope of the appended claims.

In the drawings:

Fig. 3 is a top plan with parts broken away.

Fig. 4 is a detail view illustrating the shifting mechanism for the keyboard and portions of a rocker arm and key board resetting mechanism.

Fig. 5 is a detail sectional view, with parts shown in elevation, of the coin supporting tray.

Fig. 6 is a view similar to Fig. 5 looking from the opposite side of the machine.

Fig. 7 is a detail front elevation of the mechanism for placing the machine on a basis for ejecting coins from a fraction of a dollar.

Fig. 8 is a top plan of a unit to be attached to the machine for delivering a double number of coins upon each operation of the keys.

Fig. 9 is a horizontal section on the line 9—9 of Fig. 12.

Figs. 10 and 11 are fragmental details showing the normal and downward position of the operating keys of the units shown in Fig. 8.

Fig. 12 is a side elevation of the unit shown in Fig. 8.

Figure 1:
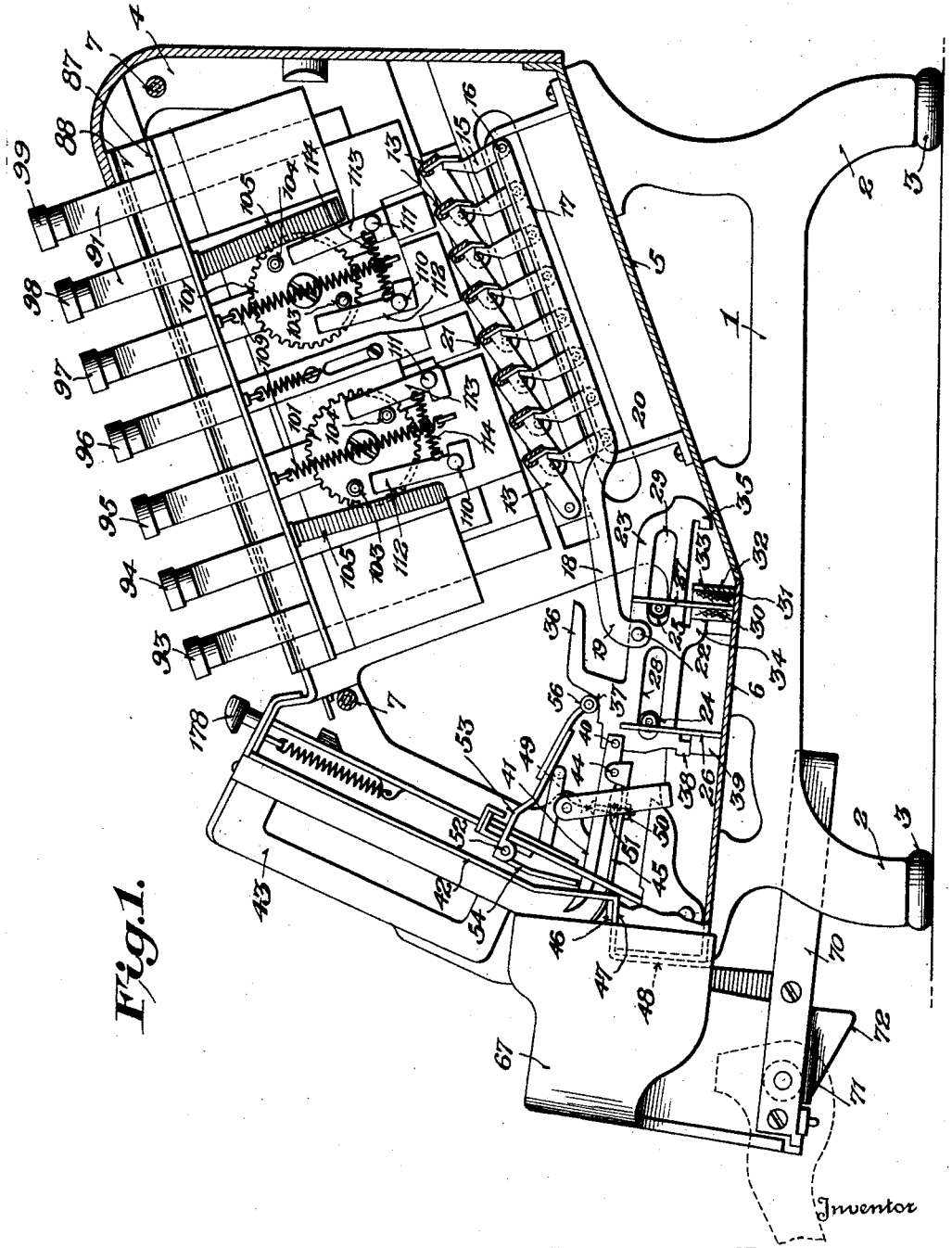
Fig. 1 is a side elevation with parts shown in section.

Figs. 13 and 14 are detailed sectional views on lines 13—13 and 14—14 respectively of Figs. 9 and 12.

Fig. 15 is a side elevation, with parts in section, of the holding and releasing means for the shiftable keyboard.

Fig. 16 is a section on the line 16—16 of Fig. 15 looking in the direction of the arrows; and Fig. 17 is a section on the line 17—17 of Fig. 15 looking in the direction of the arrows.

In the drawings 1 indicates the supporting castings of which there is one on each side of the machine, these supporting castings having the legs 2 at each end and the legs having the removable blocks 3, of rubber or the like, secured thereto. Supported on the castings 1 are the side frames 4 and the bottom plates 5 and 6, the bottom plate 5, as shown, extending downwardly at an angle from the rear end of the machine towards the center and the bottom plate 6, as shown, extending downwardly at an angle from the forward end of the machine towards the center, the inner ends of the plates 5 and 6 meeting as shown. The side frames 4 are connected by the transversely extending rods 7 which extend therebetween. A set screw 8 passes through one of the side frames and engages in a threaded opening 9 formed in the end of the rod, the opposite end of the rod being exteriorly threaded as shown at 10 to receive an interiorly threaded sleeve 11. A set screw 12 passes through the opposite side frame and engages the interiorly threaded sleeve 11 as shown. It will thus be seen that an adjustment of the rods may be secured for positioning the side frames or adjusting them one relative to the other. Pivotally connected to the side frames 4 are a plurality of rocker arms 13 which are nested as shown, said rocker arms being supported in the normally raised position by means of the coiled springs 14, the upper ends of the coiled springs being connected to the side frames and their lower ends being connected to the rocker arms. Secured to each of the rocker arms 13 is a depending arm 15 which is pivotally connected at 16 to a pusher bar 17, said pusher bar extending parallel with the base plate 5 and having at its forward end the extension 18 which is on a somewhat higher plane and has its forward end downwardly curved as shown at 19. Secured to the base plate 5 is an inverted U-shaped bracket 20 which limits the downward movement of the rocker arms, the horizontal portion of this bracket being somewhat resilient so that when the rocker arms are depressed it will take up jar and thereby protect the operating mechanism as will be readily apparent. The upper edges of the rocker arms are rounded as shown at 21 to form a bearing for the fingers of the operating keys.

The downwardly curved ends 19 formed on the extensions 18 of the pusher bars 17 are pivotally connected at 22 to the slidable plates 23 which are mounted upon the rollers 24 and 25 which are rotatably supported by the vertically extending plates 26 and 27 respectively. The rollers 24 and 25 operate in the elongated openings 28 and 29 formed in the plates 23, said slots allowing the plates to be slid parallel to the bottom plate 6. Secured on opposite sides of the plate 27 are the fibre blocks 30 and 31, a metal plate 32 being secured to the outer face of the block 31 and having notches 33 formed in the upper edge thereof. The plates 23 have the downwardly extending projections 34 and 35 formed on the lower edge, the projection 34, when the plate 23 is in its rearward position, engaging the fibre block 30 and the projection 35, when the plate is in its forwardmost position extending through the notches 33 in the plate 32 and engaging the fibre block 34. An upwardly extending projection 36 is formed on the forward upper edge of the plate 23 and forms a shoulder 37 for a purpose which will be presently brought out. A projection 38 is formed on the forward lower edge of the plate 23 and normally rests upon the block 39 secured to the forward face of the plate 26.

Pivotally connected at 40 to each of the sliding plates 23 is a coin ejecting finger 41 which passes through the plate 42 at the front of the machine and through a slot formed in the lower edge of the coin tray 43. Pivotally connected at 44 to the finger 41 is a second finger 45 which also passes through the opening in the plate 42 and the opening in the coin tray 43. This lower finger 45 normally rests on and is slidable upon the plate 46 secured to the inwardly extending portion 47 of the upwardly extending flange 48 which is formed on the forward edge of the bottom plate 6. A bolt 49 passes through the fingers 41 and 45 and receives the nut 50 which engages the lower face of the finger 45. A coiled spring 51 surrounds the bolt 49 between the fingers and normally holds them in spaced relation so that the finger 45 will engage the plate 46 and the finger 41 will be in a position to eject the coins, which are supported in the coin tray.

The coin tray 43 is preferably of the detailed construction shown in my companion application Serial No. 715,662 of which the present application is a division and as the detailed construction of this coin tray forms no part of the present invention a further detailed description thereof is not thought necessary at the present time. Suffice to say that there will preferably be eight stacks of coins supported by the tray. There will be three stacks of pennies, one stack of nickels, two stacks of dimes, one stack of twenty-five cent pieces, and one stack of fifty cent pieces. The ejecting fingers operating on two of the stacks of pennies will deliver two at a time. pivotaly mounted on the transversely extending rod 52 are the locking levers 53, there being one locking lever for each of the slidable plates 23. Each of the locking levers comprises a substantially vertically extending portion 54 and a substantially horizontally extending portion 55, the portion 55 having a roller 56 mounted at its rear end. The vertically extending portion of the locking lever extends in position to be engaged by a member carried by the coin tray and when there are coins in the particular compartment of the coin tray the coin engaging member carried thereby will be held in its rearwardmost position and will hold the rear or roller end of the locking lever in raised position so that the plate 23 may be freely slid. When the stack of coins becomes low the coin engaging member carried by the tray will swing into the coin compartment and thereby allow the rear or roller end of the locking lever to fall and engage the shoulder 37 formed on the sliding plate 23. When in this position the plate 23 cannot be slid to eject coins. The construction and arrangement of the coin engaging member carried by the coin tray is clearly shown in Fig. 5 of the drawings. When the sliding plate 23 is held in locking position notice will be given to the operator of the machine that a new supply of coins is necessary. The locking levers may be released in the manner shown and described in my copending application of which the present application is a division. This releasing mechanism includes the rocker rod 57 which is pivotally mounted in the side frame of the machine and extends beneath the horizontal portions of the locking levers as more particularly illustrated in Figs. 6 and 7 of the drawings. Secured to the base 6 is a bracket 58 which extends vertically and is provided with the elongated openings 59 and 60, the opening 59 being formed with the right angle extension 61 at its upper end. A bar 62 extends through an opening formed in the base plate 6, adjacent the forward end of the machine, and parallel with the bracket 58. The lower end of the bar 62 is bent at right angles as shown at 63 to form a portion adapted to be engaged by the fingers of the operator of the machine to slide the bar vertically. The upper end of the bar is provided with the right angle extension 64 which extends beneath the rocker rod 57 and in engagement therewith.

Formed on or secured to the bar 62, intermediate the ends, are the headed studs or projections 65 and 66, the stud or projection 65 operating in the opening 59 and the stud or projection 66 operating in the opening 60 of the bracket. As more particularly illustrated in Fig. 6 of the drawings the headed studs or projections 65 and 66 normally engage the lower edges of the openings 59 and 60 and when the locking levers 53 are in position with the rollers 56 engaging the shoulders 37 of the slidable plates 23 the substantially horizontal portions of the locking levers will engage on the rocker rod 57. When it is desired to raise the locking levers so as to release the slidable plates 23 the operator engages the extension 63 on the lower end of the bar 62 and pushes the same upwardly so that the stud or projection 65 will be received in the right angle extension 61 of the opening 59. When the lug or projection 65 is in the right angle extension 61 of the opening 59 the bar 62 will be held in its raised or uppermost position. As the bar 62 is raised the right angle extension 64, engaging the rocker rod 57 will swing the same and thereby raise the locking levers from engagement with the slidable plates 23. It will be understood that when the coins become low in the tray that it will be desired to release the locking levers so that the sliding plates may operate to eject all of the coins that are in the tray without replenishing the stack. Of course, it will also be desirable to release the locking levers prior to introducing the coins into the tray. After the coins are ejected from the coin tray they will drop into the chute 67 which is formed or secured on the forward end of the machine, the bottom of the chute being downwardly inclined from opposite ends as shown at 68 and leading to the central opening 69. Secured to the under side of the machine and extending forwardly to a point beneath the central opening 69 of the chute 67 is a frame 70 forming a guide in which operates a slidable plate 71 which normally extends beneath the central opening 69 of the chute and forms a closure therefor. Formed on the bottom of the plate 71 is a substantially semi-circular depending flange 72 which forms a finger engaging portion for engagement by the operator for sliding the plate longitudinally of the frame to remove the plate from beneath the opening 69 and allow the coins to pass therethrough into the hand of the operator or in a suitable receptacle provided for the reception of the coins. For a further detail description, and illustration, of the slidable plate 71, and its associated parts, reference is made to the companion application Serial No. 715,662 of which the present application is a division.

For operating the coin ejecting mechanism I provide a plurality of keys which when depressed operate the coin ejecting mechanism to eject the combination of coins, the keys being carried by a slidable keyboard which sets at an angle so that the designating marks upon the keys may be easily read by the operator. The keyboard is mounted upon rollers so as to be freely movable into its different positions without undue friction. As has been previously stated, when the keyboard is in its raised position the machine will operate on a "changer" basis and when the keyboard is in its lowered position the machine will operate on a "payer" basis.

Figure 2:
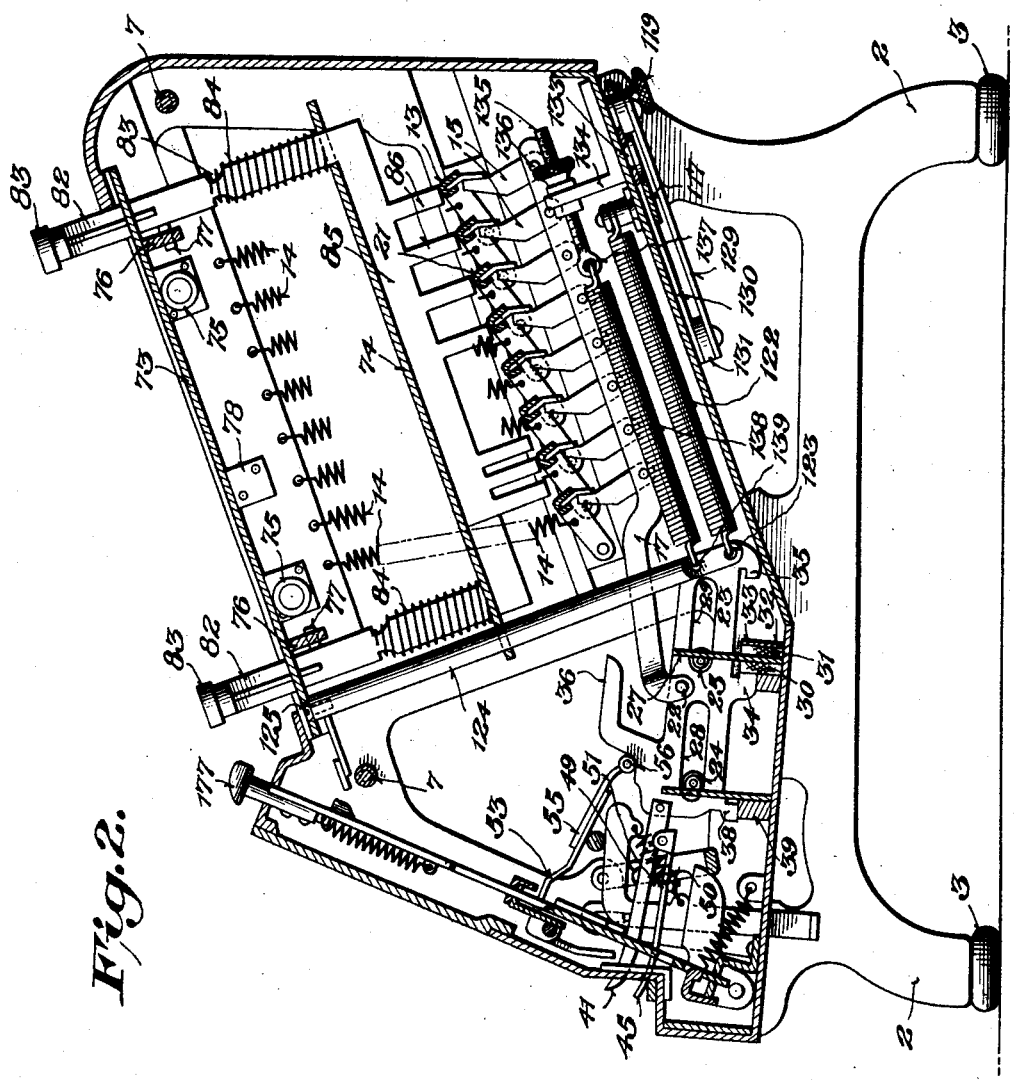
Fig. 2 is a vertical longitudinal section on the line 2—2 of Fig. 3.

The keyboard comprises the top plate 73 and the bottom plate 74 spaced therefrom, the top plate being supported for sliding movement upon the rollers 75 which are secured to each of the side frames 4 of the machine. As shown more particularly in Fig. 2 of the drawings the front supporting rollers will be on a somewhat lower plane than the rear supporting rollers so as to support the keyboard in slightly inclined position so that, as has been previously stated, the designating marks upon the several keys forming a part of the keyboard may be easily read by the operator. In order to prevent lateral or side movement of the keyboard with respect to the frame of the machine and to aid in preventing undue friction in the sliding movement of the keyboard I secure to the upper plate the longitudinally spaced transversely extending bars 76 to opposite ends of which are secured the rollers 77 which engage the sides of the frame. It will thus be seen that by providing the supporting rollers and the rollers on the ends of the bars which engage the sides of the frame that the keyboard may be raised and lowered at the will of the operator without undue friction. Secured to one of the side frames 4 is a block 78 which is adapted to be engaged by the arms 79 which are secured to the keyboard, these arms engaging the block to limit both the upward and downward movement of the keyboard. The edge of the upper plate 73 will be cut away as shown at 80 so as to leave space to prevent the block 78 from engaging with the plate. The upper plate 73 is also cut away, adjacent one edge, as shown at 80 to form a sight opening through which will show either "Chg.", when the keyboard is in raised position, or the word "Pay", when the keyboard is in lowered position, so as to indicate to the operator whether the machine is set for operation on the "changer" or "payer" basis. Both the upper plates 73 and the lower plate 74 are provided with a plurality of openings, those in the lower plate being in alignment with those in the upper plate, to receive the substantially vertically extending key bars 82, said key bars having on their upper ends the buttons or finger pieces 83 bearing designating marks preferably in the form of numerals. Each of the key bars is provided on its edges with a cut-out or notched portion 83 and a coiled spring 84 surrounds each of the bars, the upper end of the spring engaging the shoulder formed by the cut-out or notched portions 83 and the lower end engaging the upper face of the bottom plate 74 so as to normally hold the key bars in their raised positions. Each of the key bars is formed on its lower end with a horizontal extension 85 which in turn has a plurality of downwardly extending fingers or projections 86 which will be spaced in such a manner as to engage the desired rocker arms to eject the proper combination of coins from the coin tray. The fingers or projections 86 are of such a width that they may be received between the rocker arms for a purpose which will be presently apparent. The fingers or projections 86 when the keyboard is in raised position, or on a "changer" basis engage a certain group of the rocker arms and when in a lowered position or on the "payer" basis other projections or fingers will engage other groups of rocker arms, those projections or fingers not engaging the rocker arms being received in the space between the rocker arms and being thereby inoperative. The upper edges of the rocker arms being rounded will allow the ends of the fingers or projections 86 to properly operate to depress the rocker arms and thereby operate the pusher bars and associated coin ejecting mechanism, the angle at which the coin bars are arranged relative to the slidable plates 23 and associated coin ejecting mechanism being such as to allow the parts to freely slide and the coin ejecting fingers to properly engage the coins which are supported at an angle in the coin tray to prevent accidental displacement of the coins in the several stacks.

At times it is desirable to quickly receive double the amount which is indicated on the keys and in order that this may be done I have provided certain keys and ejecting mechanism so that the amount designated upon the keys will be delivered from the coin tray upon the depression of the keys and a similar amount will be delivered from the coin tray upon the upward movement of the key or upon the return movement of the key to its original or raised position. These particular keys are carried by a separate unit which when secured to the upper plate 73 of the key board forms a continuation thereof and in fact the supporting rollers 75 which are on the frame of the machine adjacent this particular unit engage beneath the unit which is slidable thereon. The unit comprises a plate 87 which on one edge is formed with the vertically extending flange 88, the upper edge of which is bent at right angles to form the horizontal portion 89 which is provided with the longitudinally spaced openings 90 whereby the unit may be secured to the plate 73. As shown more particularly in Fig. 3 of the drawings the transversely extending bars 76 extend over the upper face of the plate 87, the plate being formed with one longitudinal edge at an angle to allow the proper positioning of the bars. A plurality of substantially vertically extending key bars 91 are carried by the plate 87 and extend through the openings formed therein, certain of the key bars extending on one side of the vertically extending plate 92 depending from the plate 87 and the other key bars extending on the opposite face thereof. Each of the key bars 91 operated by the keys 94, 95, 97, 98 and 99 is formed on one vertical edge with a rack 100 which meshes with a gear wheel 101 rotatably connected to the depending plate 92 by means of the screw or rivet 102. As shown there are a plurality of gear wheels secured to each face of the depending plate 92, the gear wheels on each face of the plate being longitudinally spaced as shown more clearly in Fig. 12 of the drawings. While any number of gear wheels may be used as required the unit which is disclosed in the drawings comprises five of such wheels, three being mounted on one face of the depending plate and two being mounted on the opposite face thereof. A description of one of the gear wheels and its associated parts will suffice for all. Each of the gear wheels has the studs or pins 103 and 104 secured to one face thereof, these studs or pins being so arranged as to extend on different sides of the vertical center of the gear securing pin or rivet 102 as more clearly illustrated in Fig. 12 of the drawings. A coiled spring 105 has one end secured to the plate 87 and the opposite end connected to the key bar 91 so as to normally hold the key bar in raised position. A plate 106 is carried by each of the screws or rivets 102 being positioned between the associated gear wheel and the face of the plate 92, these plates being provided with an elongated vertically extending opening 107 whereby the plate may be moved vertically. Each of the plates 106 is also provided with a foot or extension 108 which is adapted to engage the rocker arms for operating the coin ejecting mechanism. A coiled spring 109 has one end secured to the plate 87 and the opposite end connected to the plate 106 so as to normally hold the plate in raised position. Pivotally connected to each of the plates 106, at 110 and 111 respectively are the vertically extending dogs or arms 112 and 113 the upper ends of these dogs or arms being respectively in a position to be engaged by the pins or studs 103 and 104, when the gears 101 are operated, the upper ends of the arms or dogs being drawn inwardly towards one another by means of the coiled spring 114 which has its ends secured to the dogs. The inward movement of the dog 112 is limited by the pin 115 and the inward movement of the arm or dog 113 is limited by the pin 116, these pins 115 and 116 being formed on or secured to the depending plate 92. Secured to the upper ends of the key bars are the finger pieces or buttons which bear designating marks showing the coins which will be ejected from the coin tray upon each operation of the key bar. The buttons or finger pieces are shown at 93, 94, 95, 96, 97, 98 and 99. When the key bar 93 is depressed five pennies will be ejected upon the downward movement of the key bar. When the key 94 is operated five pennies will be delivered from the coin tray on each movement of the key bar. In other words when the key 94 is depressed it will operate the gear 101 associated therewith and will rotate the same in the direction indicated by the arrows in Figs. 10 and 12 of the drawings. This movement will cause the pin or projection 103 to engage the upper edge of the dog or arm 112 and force the same downwardly with the plate 106 and the lower edge of the plate will engage the rocker arms to operate in turn the ejector fingers associated with the first three stacks of coins which are pennies. One penny will be ejected from the first stack and two pennies from both the second and third stack. When this downward movement of the key has been completed the upper end of the dog or arm 113 will be positioned beneath the pin or projection 104, as shown more particularly in Fig. 10 of the drawings and as the key is released and raises the gear wheel 101 will be rotated in the direction indicated by the arrow in Fig. 11 of the drawings to engage the pin or projection 104 with the upper end of the arm or dog 113 to again lower the plate 106 to engage the rocker arms for again ejecting five pennies as has been previously described. It will thus be seen that when the key is pressed downward five pennies will be ejected and then when the key is released and moved upwardly it will again eject five pennies.

When the key 95 is operated one nickel will be delivered upon each movement of the key bar in the same manner as described for the operation of the key 94. When the key 96 is operated two dimes will be delivered upon the downward movement of the key bar. When the key 97 is operated two dimes will be delivered from the coin tray in each direction of the key bar in the same manner as described for the operation of the key 94. When the key 98 is operated one quarter will be delivered upon each operation of the key bar and when the key 99 is operated one fifty cent piece will be ejected from the coin tray upon each movement of the key bar in the same manner as set forth for the operation of the key 94. It will thus be seen that I have provided quick and easy means for ejecting a plurality of coins from the coin tray a combination of coins being ejected upon the downward movement of the key bar and the same combination ejected upon the upward movement of the key bar. When the key bars are in their normal or raised positions the studs or projections 103 and 104 will be in the position shown in Fig. 12 of the drawings it being noted that the stud or projection 103 will be positioned above the upper end of the arm or dog 112 and the stud or pin 104 will be positioned in engagement with the inner vertical edge of the arm or dog 113 intermediate the ends thereof. When the key bar is depressed the rack 100 meshing with the gear 101 will rotate the gear in the direction indicated by the arrows in Figs. 10 and 12 of the drawings so that the stud or pin 103 will engage the upper end of the arm or dog 112 and thereby lower the plate 106 so that the arm or extension 108 will engage the desired rocker arm 13 to eject the coins from the tray. This movement of the gear wheel 101 raises the stud or pin 104 to a position above the upper end of the dog or arm 113. As the key bar starts to return to its normally raised position it naturally rotates the gear 101 in the opposite direction or in the direction indicated by the arrow in Fig. 11 of the drawings and allows the plate 106 to be raised by the coiled spring 109 until the stud or pin 104 engages the upper end of the arm or dog 113. The continued movement of the gear wheel forces the arm or dog downwardly and carries with it again the plate 106 which ejects the same number of coins as has been ejected upon the downward movement of the key bar. When the key bar reaches substantially its uppermost position the stud or pin 104 will move from the end of the arm or dog 113 and allow the plate 106 to again be raised in its original position by the coiled spring 109. As has been previously stated the coiled spring 105 acts to raise the key bar to its original position after the button or finger piece associated therewith has been released by the operator. It will be understood that while the operation of each of the key bars ejects a different combination of coins from the coin tray nevertheless the movement of the several associated parts will be the same and it will be further stated that the same combination of coins will be ejected from the coin tray by the keys of the just described unit where the machine is operated on a "changer" or on a "payer" basis.

The plates 106 are of such a length as to extend over a number of the rocker arms and will operate to discharge the same number of coins whether the machine is on a "changer" or "payer" basis. It will be understood that the key bars operated by the keys 93 and 96 are not what might be termed double acting, but these two keys merely eject the coins upon the downward movement of the key bars. With the key bars operated by the keys 94, 95, 97, 98 and 99 coins are ejected on both the downward and upward movement of the key bars.

For shifting the position of the keyboard from a "changer" to a "payer" or from a "payer" to a "changer" basis I have provided a lever which is operable beneath the bottom plate 5 in easy reach of the operator. This lever is indicated at 117 and at its inner end is connected to a pin 118 which passes through the bottom plate 5. A downwardly extended knob 119 is formed on or secured to the outer end of the lever for engagement by the operator. Secured to the upper end of the pin 118, above the bottom plate 5, is a lever 120 which is of less length than the lever 117 as is more particularly illustrated in Fig. 4 of the drawings. Extending upwardly from the free end of the lever 120 is a stud or projection 121 to which is connected one end of a coiled spring 122, the opposite end of the spring being secured in an eye 123 formed adjacent the lower end of a substantially vertically extending rod 124, the upper end of said rod 124 being secured to the upper plate 73 of the keyboard by means of a screw 125 or other suitable fastening means. Formed in the bottom plate 5 is an arcuate-shaped opening 126 through which extends a pin 127 which is secured to the levers 117 and 120. The movement of the levers is limited by the engagement of the pin 127 with the ends of the opening 126. The lever 117, adjacent the free or outer end, operates in a guide which is secured to the under side of the bottom plate 5 by means of the screws 128 or other suitable fastening means. This guide comprises the bottom plate 129 and the top plate 130 which receives therebetween, at the ends, the spacing strips or blocks 131 which spaces the top and bottom plates apart a sufficient distance to allow the lever 117 to freely operate therebetween. As shown more particularly in dotted lines in Fig. 4 of the drawings the top and bottom plates of the guide are arcuate in shape and the top plate 130 is provided with a plurality of longitudinally spaced openings 132 adapted to receive a projection 133 formed on the upper face of the lever 117, said projection 133, when received in one of the openings 132, holding the lever in its adjusted positions. Secured to the upper surface of the bottom plate 5, adjacent the rear edge thereof, is an angle bracket 134 carrying the adjusting screw 135 which extends through the vertical portion thereof, said adjusting screw passing freely through the bracket and being adjusted by means of the thumb nut 136 which is carried thereby and engages one face of the bracket. The adjusting screw is formed on one end with a perforation 137 in which is connected one end of a coiled spring 138, the opposite end of the coiled spring being connected in the eye 139 formed in the rod 124 above the eye 123.

When the lever 117 is swung rearwardly of the machine it will carry with it the relatively short lever 120 and the coiled spring 122 will draw the keyboard towards the rear of the machine. The lever 117 being of a spring construction will position the projection 133 in one of the openings 132 and the lever will be held in its adjusted position. When in this rearward position the keyboard is on a "changer" basis and when it is desired to change to a "payer" basis the lever 117 is swung inwardly and carries with it the lever 120. This movement of the levers allows the coiled spring 122 to draw or push the keyboard downwardly, the downward movement of the keyboard being aided by gravity as the keyboard is mounted, as has been previously stated, at an angle. When the keyboard is in its lowered position or on the "payer" basis the coiled spring 138 will be expanded or placed under tension and this spring will aid in returning the keyboard to its uppermost position when the lever 117 is moved for that purpose. In other words the spring 138 acts more or less as a balance spring and for automatically returning the keyboard to raised position when said keyboard is moved into lowered position for one operation only in a manner as will be later described.

As has been previously described it is often desired that when the keyboard is set on a "changer" basis for permanent operation that the keyboard be moved for a single operation on the "payer" basis or when set for permanent operation on a "payer" operation that it be moved for a single operation on the "changer" basis when such an emergency arises it will be apparent that some means should be provided for automatically returning the keyboard to that basis upon which it is set for permanent operation. I have provided such means whereby the keyboard may be moved for a single operation on either of its operations and which will be automatically returned to its permanently set basis after the single desired operation has been completed. Secured to one of the side frames 4 of the machine are the vertically spaced screws or bolts 140 upon which are mounted a vertically extending plate 141, said plate having the elongated openings 142 through which the screws pass. Intermediate the openings 142 is an elongated opening 143, a lug or projection 144 being formed at the lower end thereof. Secured to this lug or projection 144 is one end of a coiled spring 145, the opposite end of the coiled spring being secured to an eye 146 which is formed on or secured to the side frame 4. This coiled spring 145 normally holds the plate 141 in its raised position. Formed on one vertical edge of the plate 141 is the right angle extension 147 which carries the roller 148, said roller projecting from that face of the lug or projection adjacent the side frame 4 for a purpose which will be presently described. Formed on the upper end of the plate 141 is the vertically extending projection 149, this projection being preferably positioned adjacent the vertical center line of the plate. Secured to the under side of the top plate 73 of the keyboard, by means of the rivets or other suitable fastenings 150 is a flat spring 151 the free end of which will normally be spaced from the bottom of the plate. Extending upwardly from the spring, and through the plate 73 is the knob or finger piece 152 and secured to the under side of the spring is a block 153 having the recess 154 formed in its under face. Mounted in the recess 154 is a roller 155, said roller being of such a diameter as to leave a space on each side thereof of a sufficient width to receive the projection 149 formed on the upper end of the plate 141.

Pivotally connected at 156 to the side of the frame 4 and between the inner face of said side plate and the slidable plate 141 is a latch 157, one end of which is beveled as shown at 158 and the opposite end is reduced as shown at 159 and extends over the top of the roller 148 and normally in contact therewith. Secured to the extension 159 is one end of a coiled spring 160, the opposite end of the spring being secured to a projection 161 formed on the frame. This spring 160 has a tendency to normally hold the extension 159 in substantially horizontal position, the upward movement thereof being limited by a pin 162 extending inwardly from the side frame 4.

Extending upwardly from the bottom plate 5 are the brackets or standards 163 and 164, the bracket or standard 163 having the inwardly extending horizontal pin 165 and the bracket or standard 164 having the inwardly extending horizontal pin 166. Carried by the pins 165 and 166 for vertical swinging movement is the frame 167, a coiled spring 168 being positioned on the pin 165 and engaging the inner face of one arm of the frame 167 as is more clearly shown in Fig. 4 of the drawings. The opposite end of the coiled spring is engaged by a washer 169 which is held upon the pin by means of the nut 170. The coiled spring 168 not only allows for a slight longitudinal movement of the frame between the pins but also normally holds the frame 167 in raised or substantially horizontal position. Secured to the frame 167 and extending beyond one end thereof is the bar 171 to the outer end of which is secured a plate 172 to which the bell crank lever 173 is pivotally connected at 174. Secured to the vertical arm of the bell crank lever 173 is one end of a coiled spring 175, the opposite end of the spring being connected at 176 to the plate 172. This coiled spring 175 normally holds the horizontal arm of the bell crank lever 173 in engagement with the upper surface of the latch 157. The frame 167 and the extension bar 171 are positioned beneath the rocker arms 13, as more clearly illustrated in Fig. 4 of the drawings so that when the rocker arms are depressed they in turn will depress the frame and its associated parts.

Assuming that the machine is set for operation on a "payer" basis the lever 117 will be swung towards the forward end of the machine so that the keyboard will be in its lowered position. It is desired to make a single operation on the machine on a "changer" basis and to do this the knob or finger piece 152 will be engaged and raised to disengage the member 153 from the projection 149 and then the keyboard will be slid rearwardly of the frame or in its uppermost position. When in this position the knob or finger piece 152 is released and the projection 149 on the upper end of the plate 141 will be received on the forward side of the roller 155 as is quite clearly illustrated in Fig. 15 of the drawings. The proper key of the keyboard is depressed for making change and upon the depression of the rocker arms 13 it in turn will depress or lower the frame 167. As the frame 167 is lowered the horizontal arm of the bell crank lever 173 will ride over the beveled end 158 of the latch 157 without causing movement of the plate 141. As the rocker arms raise, after the coins have been ejected from the coin tray, the coiled spring 168 will raise the frame 167 and the bell crank lever 173 will engage beneath the end of the latch 157 and swing said latch on its pivot 156. This will lower the extension 159 for engaging the roller 148 and lower the plate 141 and remove the projection 155 on the top of said plate from engagement with the roller 155. This will allow the keyboard to drop, by gravity, in its original set position to operate on the "payer" basis. If the machine is set for permanent operation on a "payer" basis the action will be just the reverse. When the machine is on the "payer" basis and is temporarily set to "changer", the lever 117 will be in its forward position, the spring 122 will be slack and the spring 138 will not be so strong as to prevent the keyboard from falling back to its "payer" position. When, however, the machine is permanently set as a "changer" the lever 117 will be in its rearward position, tensioning the spring 122. Then if the keyboard be shifted temporarily to its lower or "payer" position, the combined tension of the spring 138 plus the spring 122 will be sufficient to raise it, against the force of gravity, back to its "changer" position.

When the machine is set for operation on a "changer" basis it normally delivers change from a dollar but at times it may be desired to deliver change from 25¢, 50¢ or 75¢. In order that this may be done I have provided the keys 177 and 178 which are operated for controlling mechanism as described in my co-pending application Serial No. 715,662 of which the present application is a division. As this part of the machine forms no basis for claims in the present application a further detail description is not thought necessary and for a further understanding of the operation of these keys 177 and 178 reference is made to my co-pending application above referred to.

From the above detail description it will be seen that I have provided a novel form of machine which, as has been previously stated, may be operated either as a "payer" or as a "changer", and I have provided certain keys which are known as "double acting" or "double paying" keys. These last mentioned keys are adapted for delivering, from the coin tray, certain combinations of coins on both the downward movement and the upward movement of the keys when the machine is operating either on a "changer" or "payer" basis. This provides for delivery of certain coins or combinations of coins very quickly and certainly much more quickly than would be the case if the keys had to be depressed twice. Bear in mind that these keys are only depressed once and deliver certain coins or combination of coins as depressed as well as when returning to their original or upward position.

Having fully described my invention what I claim as new and desire to secure by Letters Patent is:—

1. A money handling machine comprising a coin tray, coin ejecting mechanism, a slidable plate for operating the coin ejecting mechanism, arms pivotally connected to the plate, and means engageable with the arms for operating the plate.

2. A money handling machine comprising a coin tray, coin ejecting mechanism, a slidable plate for operating the coin ejecting mechanism, arms pivotally connected to the plate, and rotatable means engageable with the arms for operating the plate.

3. A money handling machine comprising a coin tray, coin ejecting mechanism, a slidable plate for operating the coin ejecting mechanism, arms pivotally connected to the plate, and means for successively engaging the arms for operating the plate.

4. A money handling machine comprising a coin tray, coin ejecting mechanism, a slidable plate for operating the coin ejecting mechanism, arms pivotally connected to the plate, a rotatable member engageable with the arms for operating the plate, and means for imparting movement to the rotatable member in opposite directions.

5. A money handling machine comprising a coin tray, coin ejecting mechanism, a slidable plate for operating the coin ejecting mechanism, arms pivotally connected to the plate, a rotatable member having projections adapted to be engaged with the pivoted arms, and means for imparting movement to the rotatable member.

In testimony whereof I hereunto affix my signature.

EDWARD J. BRANDT.